(12) United States Patent
Gienau et al.

(10) Patent No.: US 6,645,340 B2
(45) Date of Patent: Nov. 11, 2003

(54) CURABLE TWO-COMPONENT MORTAR COMPOSITION AND ITS USE

(75) Inventors: Roland Gienau, Westendorf (DE); Sascha Dierker, Merching (DE); Mechthild Krauter, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 39 days.

(21) Appl. No.: 09/765,143

(22) Filed: Jan. 18, 2001

(65) Prior Publication Data

US 2001/0035111 A1 Nov. 1, 2001

(30) Foreign Application Priority Data

Jan. 21, 2000 (DE) .......................... 100 02 605

(51) Int. Cl.⁷ .................. C09J 123/06; C09J 123/08
(52) U.S. Cl. ............ 156/330; 405/259.5; 523/401; 523/466; 523/467
(58) Field of Search ................. 523/401, 466, 523/467; 405/259.5; 156/330

(56) References Cited

U.S. PATENT DOCUMENTS

| | | |
|---|---|---|
| 4,180,166 A | 12/1979 | Batdorf |
| 5,229,438 A | 7/1993 | Ishida |
| 6,107,368 A * | 8/2000 | Roland ............... 523/401 |

FOREIGN PATENT DOCUMENTS

| | | |
|---|---|---|
| EP | 0159035 | 10/1985 |
| EP | 0454271 | 10/1991 |
| JP | 5516197 | * 12/1980 |
| WO | 9321125 | 10/1993 |

OTHER PUBLICATIONS

Patent Abstract of Japan, JP–59172570, Sep., 1984.
Patent Abstract of Japan, JP–07097431, Apr., 1995.
Derwent Publication XP–002163215, Apr., 1990.

* cited by examiner

*Primary Examiner*—Robert Dawson
*Assistant Examiner*—D. Aylward
(74) *Attorney, Agent, or Firm*—Sidley Austin Brown & Wood, LLP

(57) ABSTRACT

A curable, two-component mortar composition is described, which is based on a curable epoxide resin, at least one reactive diluent for the epoxide resin, an amine curing agent and one or more inorganic fillers, as well as, optionally, curing catalysts, rheological aids, thixotropizing agents, stabilizers, dispersants, agents to control the reaction rate and wetting agents, the amine curing agent of the curable epoxide resin and the reactive diluent being kept separate from one another to inhibit any reaction, wherein the mortar composition contains a cross-linking reactive diluent, which has functional epoxy groups with an epoxy functionality of at least 2. The mortar composition is used to fasten anchoring means in boreholes.

18 Claims, No Drawings

CURABLE TWO-COMPONENT MORTAR COMPOSITION AND ITS USE

FIELD OF INVENTION

The object of the present invention are curable two-component mortar compositions based on a curable epoxide resin, at least one reactive diluent for the epoxide resin, an amine curing agent and one or more inorganic fillers, as well as, optionally, curing catalysts, rheological aids, thixotropizing agents, fillers, dispersants, agents for controlling the reaction rate and wetting agents, the amine curing agent being kept separate from the curable epoxide resin and the reactive diluents in order to inhibit any reaction, as well as their use for fastening anchoring materials, such as tie bars in boreholes.

BACKGROUND INFORMATION AND PRIOR ART

Organic, curable, two-component mortar compositions based on curable epoxide resins and amine curing agents have long been known and are used as adhesives, lacquers, fillers for filling cracks and, for instance, for fastening anchoring means, such as tie bars, in boreholes, dowel holes and the like. When such mortar compositions are used especially at building sites in the open, difficulties arise because, on the one hand, it must be possible to handle the mortar composition well even at low temperatures and, on the other, the mortar composition must exhibit little creep at elevated temperatures. At the same time, however, the composition must have a long processing duration and, nevertheless, must cure rapidly and completely, achieving high load values even at low temperatures and good dimensional stability at elevated temperatures of the cured composition. These partially contradictory property profiles cannot be achieved readily. For example, in order to achieve good handling properties at low temperatures, it is customary to provide conventional mortar compositions with a high proportion of components of low viscosity, a small proportion of fillers and coarse fillers; however, this is disadvantageous for keeping creep low under a load at elevated temperatures. On the other hand, a long processing time is achieved by a high proportion of components of low activity and of diluents, which are not reactive and do not cross link. However, this conflicts with a short curing time.

In the German patent application 198 32 669.6, which was not pre-published, a curable epoxide composition is already proposed, which contains polyepoxide, polyamine, polyacetoacetate and a metal compound, especially the compound of a metal cation, and optionally conventional components, such as fillers, diluents, curing catalysts, rheological aids, wetting agents, dyes and pigments and the like. In this connection, the polyacetoacetate, as a reactive diluent to reduce the high viscosity of the liquid polyepoxide, and the metal compound improve the reactivity with respect to the walls of the mineral borehole.

From the German patent application 198 32 668.8, which has also not been pre-published, a curable two-component mortar composition with curable organic and curable inorganic components and curing agents is described. The curing agents are kept separate from the respective curable component to inhibit reaction, but can be activated for application or use. This composition contains epoxide resin and finely divided cement as curable components and amines and alkali silicate as curing agents. These inorganic/organic mortar compositions require the presence of water for curing the cement, by means of which the latter is reacted completely. This can lead to corrosion, especially of the steel tie bars, if cracks occur or if water penetrates into the annular gap between the tie bar and the mortar.

OBJECT OF THE INVENTION

It is an object of the present invention to indicate a curable two-component mortar composition of the type indicated above, which has improved handling properties in comparison to those of conventional commercial systems, especially at low temperatures and during long processing times, as well as a short curing time, a low tendency to creep in the cured state at elevated temperatures, good dimensional stability at elevated temperatures and a high chemical resistance, as well as high load values at low temperatures (−5° C.) up to elevated temperatures (60° C.) and, in accordance with a preferred embodiment, develops a corrosion protection effect.

SUMMARY OF THE INVENTION

This objective is accomplished by the curable two-component mortar composition of claim 1. The dependent claims relate to preferred embodiments of this inventive object, as well as to the use of this mortar composition for fastening anchoring means in boreholes in natural as well as in artificial rock.

The invention accordingly relates to a curable, two-component mortar composition based on a curable epoxide resin, at least one reactive diluent for the epoxide resin, an amine curing agent and one or more inorganic fillers, as well as, optionally, curing catalysts, Theological aids, thixotropizing agents, stabilizers, dispersants, agents to control the reaction rate and wetting agents, the amine curing agents being kept separate from the curable epoxide resin and the reactive diluent in order to inhibit any reaction, wherein the mortar composition contains a cross-linking, reactive diluent having functional epoxy groups with an epoxy functionality of at least 2.

Surprisingly, it has turned out that, due to the use of a cross-linking reactive diluent, having functional epoxy groups and an epoxy functionality of at least 2, especially with an epoxy functionality of 2 to 3, which is achieved especially by mixing a difunctional with a trifunctional reactive diluent of this type, a mortar composition is obtained, which accomplishes the task addressed above in an outstanding manner in that, due to the presence of this cross-linking reactive diluent, the disadvantages of the diluents or solvents, used in conventional mortar compositions of this type, such as, especially, monoglycidyl ether compounds, benzyl alcohol or the like, can be overcome and the viscosity, the required for good extrusion properties of the system and seating properties of the anchor, especially at low temperatures, can be adjusted selectively and, nevertheless, good curing of the mortar composition can be achieved even though processing times are sufficiently long. In the same way, a low tendency to creep under load, especially at elevated temperatures, can be achieved.

Cross-linking, reactive diluents having functional epoxy groups with an epoxy functionality are compounds, which have two epoxy groups, which react with the curing agent, and thus can bring about a cross-linking of the polymer chains.

Due to the use of the cross-linking reactive diluent with a functionality of at least 2, a degree of cross-linking, which is higher, and a reaction rate, which is high in comparison to previously used bifunctional or monofunctional reactive diluents, that is, reactive diluents with an epoxy functionality of less than 2, can be achieved at a lower viscosity of the mortar composition after the components are mixed and brought into the borehole, and with a higher degree of cross-linking and a high reaction rate.

The polymer, resulting therefrom, has an advantageous cross-linked structure. At the same time, the composition contains a lesser proportion of extractable portions and therefore tends less to form cracks, to shrink and to creep at elevated temperatures under load. Moreover, a higher dimensional stability at elevated temperatures, an improved toughness and, with that, high load values can be achieved even at elevated temperatures. Due to the use of this reactive diluent pursuant to the invention, sufficiently short curing times are achieved even at temperatures as low as −5° C.

Pursuant to a preferred embodiment, the mortar composition contains, as reactive diluent, at least one diglycidyl ether or a mixture of at least one diglycidyl ether and at least one triglycidyl ether for adjusting the epoxy functionality to an average value of at least 2. Especially preferred is the use of glycerin triglycidyl ether, pentaerythritol tetraglycidyl ether and/or trimethylolpropane triglycidyl ether or of mixtures thereof with 1,4-dihydroxybutane diglycidyl ether, cyclohexanedimethanol diglycidyl ether, neopentyl glycol diglycidyl ether, dihydroxyhexane diglycidyl ether and/or propylene glycol diglycidyl ether as reactive diluent with an average epoxy functionality of more than 2. Pursuant to the invention, the ratio by weight of difunctional reactive diluent to trifunctional reactive diluent in the mixture is 1:99 to 99:1 and preferably 30:70 to 70:30.

In accordance with a further preferred embodiment, the two-component mortar composition contains the reactive diluent or reactive diluent mixture in an amount by weight of 5 to 35 percent and preferably of 10 to 25 percent, the quantitative data, here and in the following, relating to the weight of the whole of the two-component mortar composition. In this connection, preferably a ratio by weight of curable epoxide resin to cross-linked reactive diluent of 99:1 to 50:50 and preferably of 75:25 to 55:45 is maintained.

Advantageously, the amount of reactive diluent and of any further diluents is such that, depending on the surrounding temperature, a viscosity, measured according to the Hilti Standard 0333, of 30 to 150 Pas and preferably of 40 to 60 Pas is obtained at room temperature. The viscosity of the mortar composition is measured according to the Hilti Standard 0333 with the help of a rotary viscosimeter (Haake RV3 with a 500 measuring head, a BG 142 control device, a Haake RSS suspension device with 6 pins, a pin length without thread: 200 ml). The mortar composition is filled into a 250 ml wide neck glass vessel with a screw top, care being taken to exclude bubbles. The mortar composition is then brought to a temperature of 23° C.+1° C. and the measuring device is immersed centrally in the test substance, whereupon the measurement is carried out by recording the flow curve with the help of an X-Y Hewlett-Packard recorder at an rpm of 0 to 64 per minute. The curves must show a steady course for the branch recorded with the increasing rpm as well as for the whole of the branch of the curve recorded with the decreasing rpm. The branch of the curve, recorded with the decreasing rpm is evaluated at an rpm of 4, 8, 16 and 32. The nominal viscosity is determined at 16 rpm.

In accordance with a preferred embodiment of the invention, the proportion of diluents and solvents, which do not cross-link, is less than 3 percent by weight, based on the mortar composition. As diluents, phenyl glycidyl ether, butyl glycidyl ether, o-cresyl glycidyl ether, p-t-butyl glycidyl ether, 2-ethylhexyl glycidyl ether, $C_{12}$ to $C_{14}$ alkyl glycidyl ether, $C_{13}$ to $C_{15}$ alkyl glycidyl ether, benzyl alcohol or the like are used.

The proportion of inorganic fillers in the inventive mortar composition preferably is less than 30 percent by volume and especially less than 20 percent by volume, since high strength values can be achieved even at lower filler contents due to the use of the claimed reactive diluent. The percentage by volume of the inorganic filler is determined by initially measuring the density of the mortar composition, after which the material is ashed at 950° C., as a result of which only the inorganic fillers remain behind. After the weight and density of the remaining filler is determined, the percentage by volume of the inorganic filler in the mortar composition can easily be calculated.

In accordance with a particularly preferred embodiment of the invention, the mortar composition, as inorganic filler, contains at least one filler, which is alkaline in an aqueous medium, preferably a carbonate, sulfate, oxide, aluminate or silicate of an alkali or alkaline earth metal and/or especially a cement. Moreover, the alkaline filler, contained in the anhydrous, cured, inventive mortar composition, namely the cement, is not bound, but serves as a filler and as a reserve of alkali to prevent the corrosion of the anchoring elements of steel. Accordingly, it has turned out surprisingly that, should moisture penetrate, the cement present reacts with this moisture and is cured locally and, by causing an alkaline pH, brings about a passivation of the steel surface, which is in contact with the cured mortar composition. In this way, an unexpected corrosion inhibition is achieved, which is not possible with conventional mortar compositions, in which hydraulic cements are reacted immediately with water during the curing of the mortar composition.

Advantageously, the proportion of cement in the mortar composition is 1 to 40 percent by weight and preferably 2 to 10 percent by weight, preferably Portland cement and/or aluminum oxide-containing cement, such as aluminate cement or aluminous cement being contained as cement.

The inventive two-component mortar composition preferably contains, as curable epoxide resin, a polyglycidyl ether of a multihydric alcohol, such as ethylene glycol, glycerin and especially bisphenol A, bisphenol F and/or novolak. The epoxide equivalent weights of the curable epoxide resin, used pursuant to the invention, preferably range from about 150 to 2000 and especially from 170 to 400. Suitable polyepoxide compounds are described, for example, in Lee, Neville, Handbook of Epoxy Resins (1967).

As amine curing agents, the inventive mortar compositions preferably contain an aliphatic, cycloaliphatic, aromatic and/or araliphatic amine or polyamine, such as ethylenediamine, isophorone diamine, propylenediamine, hexamethylenediamine, diethylenetriamine, triethylenetetramine, tetraethylenepentamine, m-xylenediamine etc. Especially preferred are the highly reactive Mannich bases, which are obtained by the condensation of polyamines, such as polyalkylene polyamines with aldehydes, such as formaldehyde, and monohydric or multihydric phenols and especially those without a residual content of phenols and toxic condensation products.

In the inventive two-component mortar composition, the ratio of the reactive amine hydrogens to the number of epoxy groups of the epoxide resin or of the reactive diluent is 2:1 to 0.8:1 and preferably 1.5:1 to 0.9:1.

Aside from the preferably used, alkaline reacting filler, such as quartz, silicate, aluminosilicates, corundum, ceramic fillers, glass, carbonates, such as chalk, kaolin, inorganic fibers and the like, are suitable pursuant to the invention. In certain cases, it is furthermore possible to add small amounts of organic fillers or reinforcing materials, such as organic fibers. The inventive, two-component mortar composition may furthermore contain conventional components, which are known to the expert, such as curing catalysts, rheological aids, thixotropizing agents, stabilizers, dispersants, agents to control the reaction rate, wetting agents and the like.

In accordance with a preferred embodiment of the invention, one of the components is colored so that the mortar composition, in the mixed form, stands out clearly from the substrate, which is to be treated. For example, one of the components of the mortar composition may be a dye or a pigment, so that it is possible to make the mixed mortar composition clearly different from the substrate and to check the degree of mixing of the two components. In this way, it is very easy to establish whether the components have been mixed adequately and whether the borehole was filled cleanly and, with that, whether the carrying behavior of the anchoring agent is assured. The color difference between mortar and concrete is reduced by external factors, such as weathering, so that it is lost with time.

The inventive two-component mortar composition preferably is contained separately in a two-chamber or multi-chamber device so as to inhibit reaction and can be caused to react under use conditions. Moreover, the epoxide resin and the reactive diluent are produced separately from the amine curing agent, so that the one component usually contains the curable epoxide resin and the reactive diluent, while the other component contains the amine curing agent and optionally the curing catalysts. The fillers, as well as the remaining components, may be contained in the one or also the other component.

The two-chamber and multi-chamber systems, in which the inventive, two-component mortar composition is present, include especially cartridges of glass, plastic, plastic sheets or ceramic, in the interior of which the curable components are kept separate from the amine curing agent by walls, which can be destroyed. Such cartridge systems are placed in the boreholes. To initiate the curing reaction, the cartridges, including the partitions contained therein, are destroyed, for example, by driving anchoring means, such as the tie bar, into them. Such two-chamber and multi-chamber systems also include two or more film bags for separating curable components and hardeners, it being possible to inject the contents of the film bags together, for example, over a static mixer, into a borehole. These cartridge and film bags systems contain the amine curing agent separately from the curable epoxide resin and the reactive diluent, in order to inhibit any reaction.

A further object of the invention is the use of the inventive two-component mortar composition of the above-described type for fastening anchoring means, such as tie bars, in natural as well as in artificial rock.

It has turned out that this inventive mortar composition, while having a longer processing time and curing more rapidly, results in excellent strength values, such as high load values at the temperatures of −5° C. to 60° C., which are customary in fastening techniques, as well as a high dimensional stability at elevated temperatures and chemical resistance. At the same time, it provides high corrosion protection for steel or iron anchoring means, fastened with this mortar composition.

The following example is intended to explain the invention further.

EXAMPLE

Component A

| | |
|---|---:|
| bisphenol A/epichlorohydrin resin, molecular weight 700 | 30.2% by weight |
| bisphenol F/epichlorohydrin resin, molecular weight 700 | 12.9% by weight |
| glycerin triglycidyl ether | 6.2% by weight |
| 1,4-dihydroxybutane diglycidyl ether | 9.3% by weight |
| 2-ethylhexyl glycidyl ether | 2.7% by weight |
| quartz sand ($SiO_2$) | 35.7% by weight |
| synthetic hydrophobic amorphous silica | 3.0% by weight |
| total: | 100.0% by weight |

Component B

| | |
|---|---:|
| m-xylylenediamine | 35.7% by weight |
| aliphatic polyamine | 21.8% by weight |
| benzyl alcohol | 0.3% by weight |
| cement | 16.1% by weight |
| quartz sand ($SiO_2$) | 23.1% by weight |
| synthetic hydrophobic amorphous silica | 3.0% by weight |
| total: | 100.0% by weight |

The two components A and B are filled into separate plastic film bags, component A being brought into the smaller chamber and component B into the larger film. The curing process is initiated by combining the two components A and B in a mixing ratio of A:B of 3:1 (by volume) after they are pressed out of the film bags into the mixing nozzle.

This mortar composition is transferred through the mixing nozzle into a borehole and, after the tie bar is set, cures within twelve hours at room temperature (20° C.).

The pull-out strength of the conventional, commercial tie bar (dimension M12) after curing is more than 55 kN.

What is claimed is:

1. A curable two-component mortar composition based on a curable epoxide resin, at least one reactive diluent having functional epoxy groups for the epoxide resin, an amine curing agent and one or more inorganic fillers, as well as optionally curing catalysts, rheological aids, thixopixing agents, the amine curing agents being kept separate from the curable epoxide resin and the reactive diluents in order to inhibit a reaction, wherein the mortar composition contains a mixture of a difunctional and trifunctional, cross-linking reactive diluent, having functional epoxy groups and an average epoxy functionality of the reactive diluent mixture greater than 2.

2. The two-component mortar composition of claim 1, wherein the ratio by weight of difunctional to trifunctional reactive diluents in the mixture is 1:99 to 99:1.

3. The two-component mortar composition of claim 1, wherein the reactive diluent or reactive diluent mixture is contained in an amount of 5 to 35% by weight.

4. The two-component mortar composition of claim 3, wherein the ratio by weight of curable epoxide resin to cross-linking reactive diluent is 99:1 to 50:50.

5. The two-component mortar composition of claim 1, wherein the proportion of diluents, which do not cross link, is less than 3% by weight, based on the mortar composition.

6. The two-component mortar composition of claim 1, wherein the proportion of fillers in the mortar composition is less than 30% by volume.

7. The two-component mortar composition claim 1, wherein the mortar composition contains a filler, which reacts alkaline in an aqueous medium, as inorganic filler.

8. The two-component mortar composition of claim 7, wherein the mortar composition contains a carbonate, sulfate, oxide, aluminate or silicate of an alkali or alkaline earth metal and/or a cement as inorganic filler.

9. The two-component mortar composition of claim 7, wherein the proportion of alkaline-reacting fillers, especially of the cement in the mortar composition, is 1 to 40% by weight.

10. The two-component mortar composition of claim 1, wherein Portland cement and/or aluminum oxide-containing cement, such as aluminate cement or aluminous cement is contained as cement.

11. The two-component mortar composition of claim 1, wherein a polyglycidyl ether of a multihydric alcohol and/or phenol, preferably a diglycidyl ether of bisphenol A and/or bisphenol F and/or of novolak is contained as curable epoxide resin.

12. The two-component mortar composition of claim 1, wherein an aliphatic, cycloaliphatic, aromatic and/or araliphatic amine or polyamine, preferably an alkylenepolyamine and/or a Mannich base is contained as amine curing agent.

13. The two-component mortar composition of claim 1, wherein the ratio of the number of the active amine hydrogen atoms to the number of epoxide groups of the epoxide resin or the reactive diluent is 2:1 to 0.8:1.

14. The two-component mortar composition of claim 1, wherein one of the components is dyed and the mortar composition, in the mixed form, stands out clearly from the substrate, which is to be treated.

15. The two-component mortar composition of claim 1, wherein the components are contained in a two-chamber or multi-chamber device, which inhibits any reaction, and are caused to react under use conditions.

16. The use of the two-component mortar composition of claim 1 for fastening anchoring means in boreholes.

17. The two-component mortar composition of claim 1, wherein the mortar composition contains a mixture of at least one diglycidyl ether and at least one triglycidyl ether as reactive diluent.

18. The two-component mortar composition of claim 1, wherein the mortar composition contains a mixture of glycerin triglycidyl ether, pentaerthritol triglycidyl ether, trimethylpropane triglycidyl ether or mixtures thereof and 1,4-dihydroxybutane digylcidyl ether, cylohaexanedimethanol digylcidyl ether, neopental glycol digylcidyl ether, dihydroxyhexane digylcidyl ether and/or propylene glycol digylcidyl ether as reactive diluent.

* * * * *